(12) United States Patent  (10) Patent No.: US 7,579,108 B2
Larsson  (45) Date of Patent: Aug. 25, 2009

(54) BATTERY HOLDER

(75) Inventor: Niklas Larsson, Lund (SE)

(73) Assignee: GS Development AB, Malmo (SE)

( * ) Notice: Subject to any disclaimer, the term of this patent is extended or adjusted under 35 U.S.C. 154(b) by 0 days.

(21) Appl. No.: 10/270,282

(22) Filed: Oct. 15, 2002

(65) Prior Publication Data

US 2004/0072065 A1    Apr. 15, 2004

Related U.S. Application Data

(63) Continuation of application No. PCT/SE01/00807, filed on Apr. 11, 2001.

(30) Foreign Application Priority Data

Apr. 13, 2000    (SE) ................................. 0001366-4

(51) Int. Cl.
*H01M 2/10* (2006.01)
(52) U.S. Cl. .......................................... 429/100; 429/99
(58) Field of Classification Search ...................... 429/1, 429/96, 98, 100, 149
See application file for complete search history.

(56) References Cited

U.S. PATENT DOCUMENTS 3,486,944 A     12/1969  O'Donnell
4,535,036 A      8/1985  Kelm et al.
5,169,732 A     12/1992  Beldock
6,673,485 B2 *   1/2004  Kimura et al. ................. 429/99

FOREIGN PATENT DOCUMENTS

SE           516508 C2 *    1/2002

OTHER PUBLICATIONS

Official Translation of SE516508 C2.*

* cited by examiner

*Primary Examiner*—Robert Hodge
(74) *Attorney, Agent, or Firm*—Capitol City TechLaw

(57) ABSTRACT

A battery holder comprises first and second caps and a cylindrical socket. The socket forms two spaces therein separated by an abutment midway of the socket and each opening at one end of the socket. Each space holds a battery with the central pole contact thereof positioned at the end of the socket. The socket is positioned selectively with one battery or the other engaging the contacts located at the first cap. Clamping means holds the caps together with the socket there between. The socket forms an outside circumferential groove at each end thereof and in each groove forms at least one slot through the cylindrical wall of the socket, extending over a minor part of the circumferential length of the groove. An elastic O-ring is received in each groove forming a straight portion extending through the slot inside the socket.

20 Claims, 4 Drawing Sheets

BATTERY HOLDER

CROSS REFERENCE TO RELATED APPLICATIONS

This application is a continuation application of International Application No. PCT/SE01/00807, which was filed Apr. 11, 2001, and which was published in English.

BACKGROUND OF THE INVENTION

1. Field of the Invention

Battery holder for holding batteries having a central pole contact at one end thereof, said battery holder comprising a cylindrical socket having open ends and forming two spaces therein separated by an abutment midway of the socket, for holding each a battery with the central pole contact thereof positioned at one and the other, respectively, of the open ends of the socket.

2. Description of the Prior Art

U.S. Pat. No. 3,486,944 discloses a battery holder of this type wherein the socket is closed at one end by a cap, which insulates electrically the battery pole located at said one end the socket being open at the other end where the battery pole located at said other end is uncovered so as to be engaged with an electrical contact in the appliance wherein the batteries are to be used. One battery at a time is in an active position for use while the other battery is kept as a reserve or spare battery. When the battery in active position has run down, the cap is changed from one end of the socket to the other and the spare battery is placed in the active position.

In the prior art battery holder the batteries are loose in the socket. When the batteries have small dimensions they are easily lost when it is necessary to change from one battery to the other in the active position, particularly when the change takes place under severe conditions or in the field as when the batteries are used in a firearm sight, a camera, a leveling instrument, or a similar portable device.

A primary object of the invention is to provide a battery holder of the kind referred to which allows a battery in active position to be more easily, safely and rapidly replaced by the spare battery even under severe conditions by the two batteries being positively retained in the socket and being kept together as an easily handled unit which is not too small so as not require extreme care at handling thereof.

BRIEF SUMMARY OF THE INVENTION

In order to achieve the objects mentioned above the invention provides a battery holder of the kind referred to with the characterizing features of the independent claim.

Further features of the invention are defined in the dependent claims.

BRIEF DESCRIPTION OF THE DRAWINGS

The invention will be described in more detail below with reference to the accompanying drawings which disclose an illustrative embodiment of the battery holder of the invention and wherein.

DETAILED DESCRIPTION OF THE INVENTION

Figure 1:
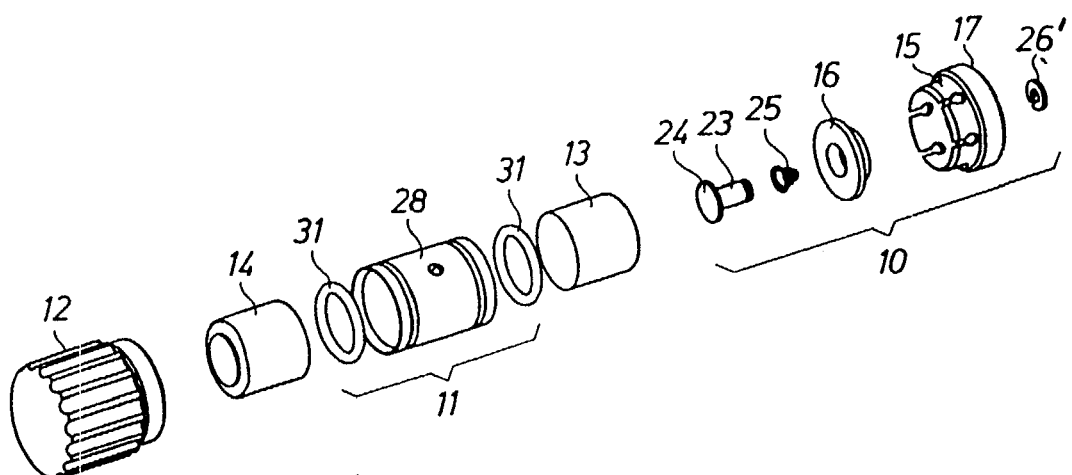
FIG 1 is an exploded view of the battery holder and two batteries to be mounted therein.

Referring to the drawings FIG 1 therein discloses the three main elements of the battery holder of the invention, viz, a contact cap 10, a battery plug 11 and a screw cap 12. Also two batteries to be mounted in the battery holder are disclosed, viz. a battery 13 which shall function as the operating battery energizing a device, and a battery 14 which is a spare battery. The batteries for the purpose of this description are assumed to be Duracell® Li/MnO$_2$ cells CR 11108, 3.0 V, size DL ⅓ N. Batteries of another make and another type can of course be used with the battery holder of the invention the dimensions of the details of the battery holder having to be modified accordingly.

Figure 2:
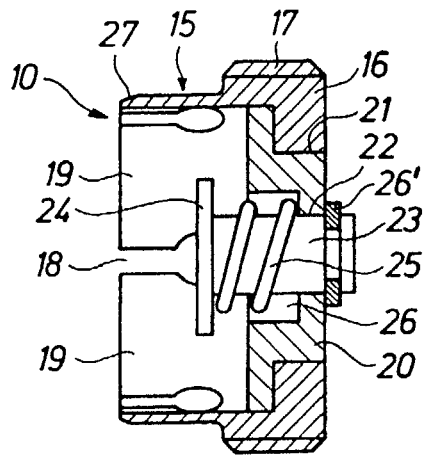
FIG 2 is an axial cross sectional view of a contact cap.
Figure 3:
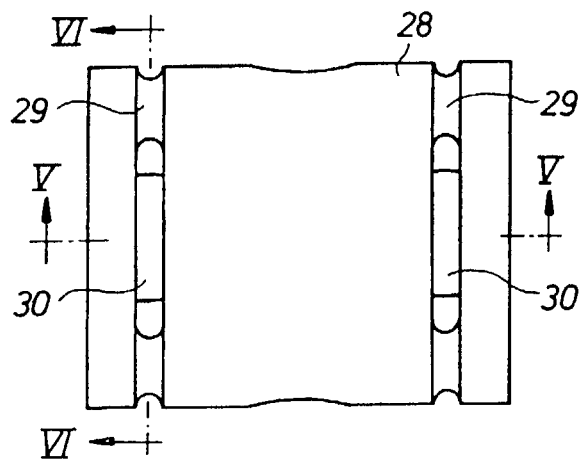
FIG 3 is a side view of the socket.
Figure 4:
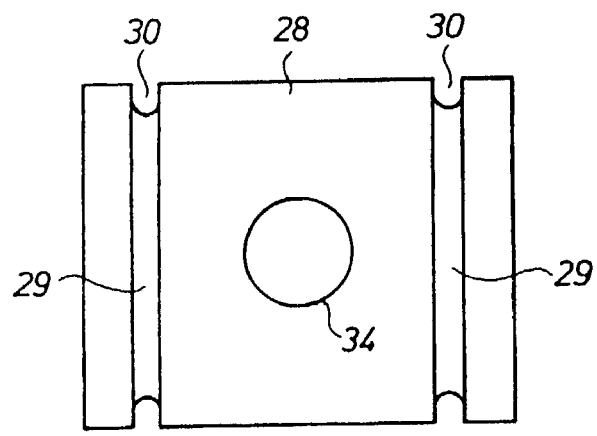
FIG 4 is a side view of the socket rotated 90° from the position in FIG 3.

Referring also to FIG 2 the contact cap 10 is cup shaped comprising a cylindrical side wall 15 and a bottom wall 16 and is made of metal or another electrically conducting material. It has an outside screw thread 17. The side wall forms six slots 18 and six flaps 19 therebetween. A plate 20 of an electrically insulating material such as polyethylene is fixedly mounted in a circular opening 21 in the bottom wall 16 and forms a central aperture 22. A metal stem 23 with a head 24, forming an electrical contact is mounted in the aperture for axial displacement therein. A helical compression spring 25 is received by a recess 26 in the plate 20 and is engaged between the head 24 and the bottom of the recess to bias the head 24 for displacement to the left as seen in FIG. 2, the displacement being limited by a locking washer 26' engaged with the stem 23 in an annular groove therein adjacent the end opposite the head. The side wall 15 is chamfered at the edge on the outside thereof at 27.

Figure 5:
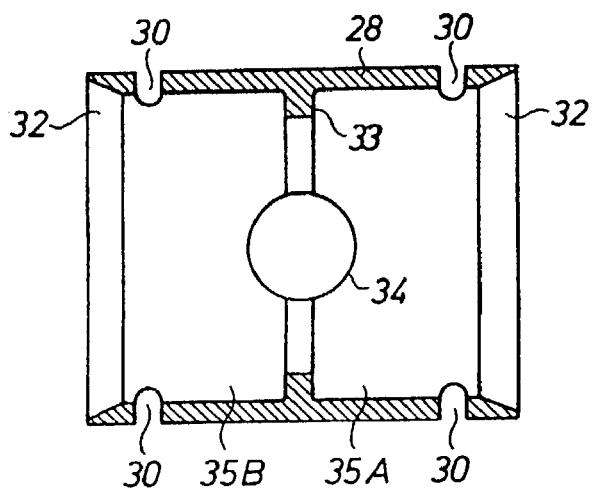
FIG 5 is an axial cross sectional view of the socket, taken along line V—V in FIG 3.
Figure 6:
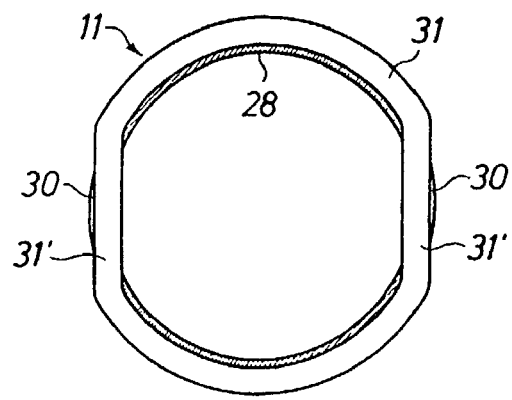
FIG 6 is a transverse cross sectional view of the socket, taken along line VI—VI in FIG 3, with an O-ring mounted in an outside annular groove.

The plug 11 is shown in more detail in FIGS. 3 to 6 and comprises a cylindrical socket 28 preferably made of metal. The socket forms two annular outside grooves 29 which are each cut through at two diametrically opposite positions to form slots 30. The plug also comprises an elastic O-ring 31 of rubber located in each groove as shown in FIG. 6. Each O-ring protrudes from the groove 29 on the outside surface of the socket while the straight portions 31' of the O-ring protrude inside the socket as can be seen in FIG. 6.

Figure 7:
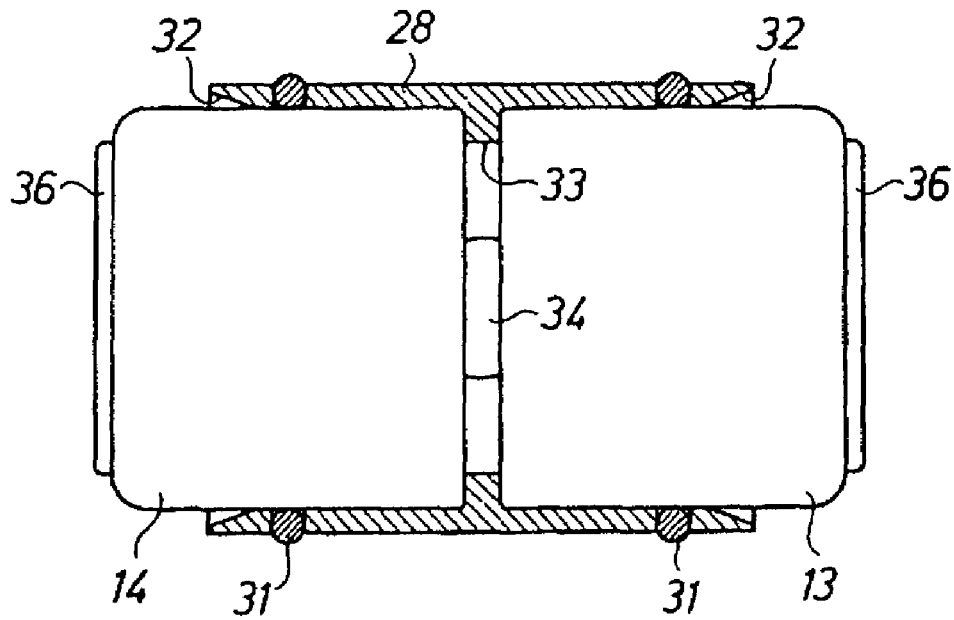
FIG 7 is an axial cross sectional view of the socket with two batteries mounted therein.

The socket is chamfered on the inside thereof at each end as shown at 32, FIG. 5, and midway of the socket there is an inside annular ridge 33 of rectangular cross sectional shape and also a circular aperture 34. The ridge divides the interior of the socket into two spaces 35A and 35B opening at opposite ends of the socket The socket 28 is dimensioned to hold therein the two batteries 13 and 14 which are inserted into spaces 35A and 35B, respectively, with the central pole contact 36 of each battery facing outwards as disclosed in FIG. 7. The central pole contact of the battery type mentioned above is the negative battery pole. The shell of the battery which is the positive pole engages the ridge 33 which forms an abutment limiting the insertion of the battery into the socket. The straight portions 31' of the O-rings exert a uniform, light pressure against the batteries so that the batteries are securely held by the socket despite variations in the outside diameter of the batteries but can be easily removed from the socket when it is desired to replace the battery. When one battery has been inserted into the socket and the other battery is being inserted air will not be trapped between the batteries, which could interfere with the insertion, since air can escape through the aperture 34. Another purpose of this aperture is to allow insertion of a tool into the socket between the batteries for removal of a battery if it has too close fit in the socket and therefore cannot be withdrawn from the socket by gripping the battery with the fingers at the projecting portion of the battery.

Figure 8:
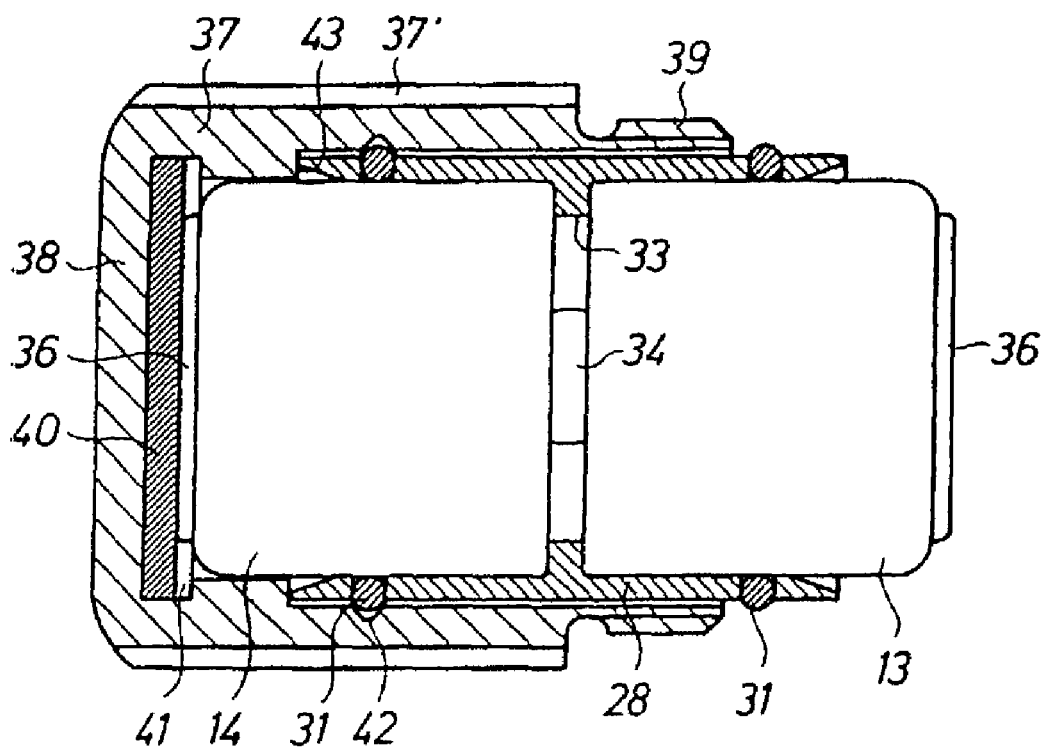
FIG 8 is an axial cross sectional view of a screw cap with the socket and the batteries received therein.

The screw cap 12, FIG. 8, is cup shaped with a cylindrical side wall 37 and a bottom wall 38. The side wall forms an outside screw thread 39 and an outside knurling 37' facilitating manual rotation of the screw cap. A disk 40 of electrically insulating material such as rubber or plastic covers the inside surface of the bottom wall 38 and is received at the edge portion thereof in an inside groove 41 of rectangular cross sectional shape. The side wall also forms an inside groove 42 of V-shaped cross section, and between the grooves the side wall forms an inside shoulder 43. The plug is dimensioned to be pushed into the screw cap 12 so that the socket abuts the shoulder 43 as disclosed in FIG. 8. The groove 41 is located in such position that the O-ring 31 at the distal end of the socket is received in the groove 42 in order to maintain the plug in the inserted position so that it cannot easily fall out therefrom though manual withdrawal of the plug is possible. The central pole contact 36 of the battery 14 engages the insulating disk 40 the central pole contact of the battery 13 being uncovered at the proximal end of the plug.

The ridge 33 should have a width which is larger than twice the protruding axial length of the central pole contact 36 so that if the batteries by mistake should be inserted into the socket with the central pole contacts facing each other the central pole contacts will not contact each other but will be held separated by the ridge in order to avoid short circuiting.

Figure 9:
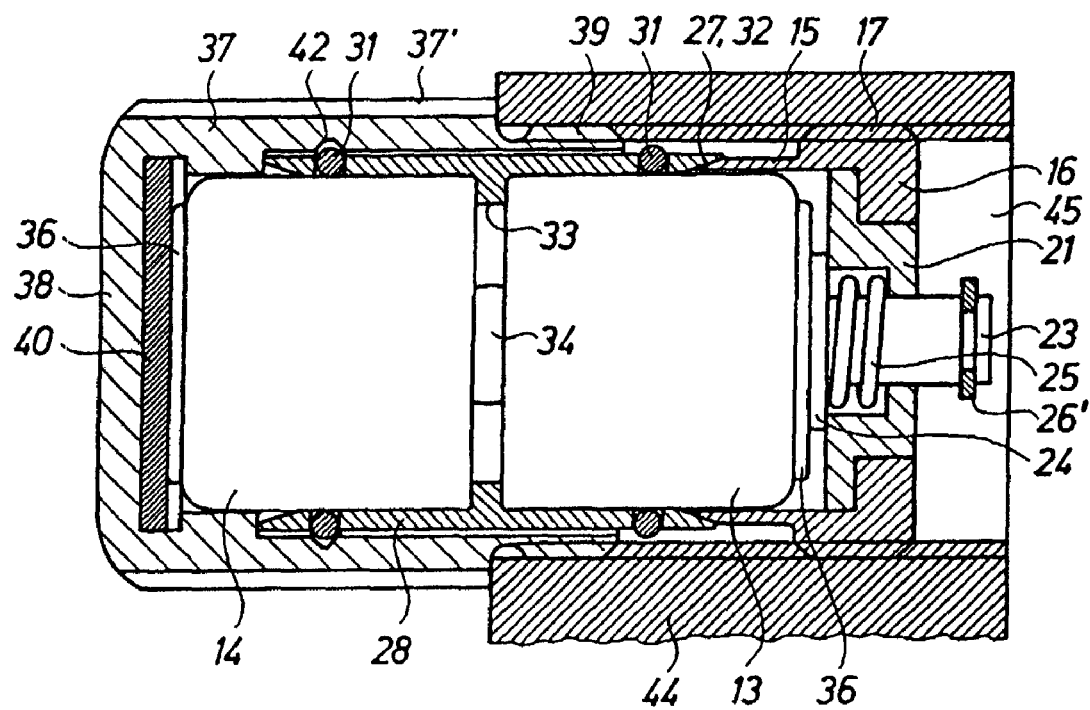
FIG 9 is an axial cross sectional view of the complete battery holder with batteries, mounted in the body of a device.

The battery holder described shall be integrated with a device of some kind that is energized by a battery, and the body of such a device is disclosed fragmentarily at 44 in FIG. 9. It forms a threaded bore 45, and the contact cap 10 is screwed into this bore and is locked therein by means of lock fluid or any other suitable lock means when the contact cap has been adjusted to the proper position in the bore. The, screw cap 12 with the plug 11 held therein is screwed into the bore the chamfered surfaces 27 and 32 being pressed against each other and as a consequence thereof the side wall 15 of the contact cap being pressed against the metal shell of the battery 13 under elastic yielding of the flaps 19 in order to establish electrical contact between the shell which is the positive pole of the battery, and the metal part 15, 16 of the contact cap. The central pole contact of the battery 13 engages the contact 24 which is pushed back against the spring bias when the screw cap is being screwed into the bore. Due to the spring bias continuous electrical connection between the central pole contact 36 of the battery 13 and the contact 24 is maintained.

Electrical wires (not shown) shall be connected, e. g. soldered, to the metal part 15, 16 of the contact cap 10 and to the stem 23, respectively, for connecting the battery 14 to the power consuming elements of the device.

The battery 13 is the operating battery delivering power to the device while the battery 14 is disconnected therefrom and serves as a spare battery. When the voltage of the battery 13 has dropped to a value which makes the battery inoperative the battery must be replaced by a fresh battery. For this purpose it is only necessary to unscrew the screw cap 12, withdraw the plug 11 therefrom, turn it around and replace it in the screw cap which is then screwed into the bore 45 again. Now, the battery 13 is disconnected and the battery 14 is the operating battery. As will be seen the spare battery is easily available and the change of battery can be performed rapidly, safely, and easily without it being necessary to take care of or handling the individual batteries. When changing battery the operator knows that he has consumed 50% of the originally available battery capacity and it is thus easier for him to keep check of the available battery capacity.

It is not necessary that the contact cap 10 and the screw cap 12 are screwed into a bore as described. The screw cap can instead be screwed together directly with the contact cap at mating screw threads 17 and 39. Any other clamping means can be provided in order to hold the elements of the battery holder together.

The invention claimed is:

1. A battery holder for holding batteries having a central pole contact at one end thereof, said battery holder comprising:
   a cylindrical socket having open ends and forming two spaces therein separated by an abutment midway of the socket, for holding each a battery with the central pole contact thereof positioned at one and the other, of the open ends of the socket;
   first and second caps;
   clamping means for holding the caps together with the batteries received in said spaces clamped there between;
   contacts on said first cap to be engaged by the poles of the battery received in the space closed by said first cap when the batteries are clamped between the caps, the socket being positioned selectively with one battery or the other engaging said contacts located on said first cap, that the socket forms an outside circumferential groove adjacent each end thereof and in each groove forms at least one slot through the cylindrical wall of the socket, extending over a minor part of the circumferential length of the groove, and an elastic O-ring is received in each groove forming a straight portion extending through the slot inside the socket.

2. The battery holder according to claim 1, wherein the socket forms two slots in each groove positioned diametrically opposite to each other.

3. The battery holder according to claim 1, wherein said first cap has a circumferential wall which is slotted axially to form resilient flaps.

4. The battery holder according to claim 3, wherein the circumferential wall of said first cap tapers slightly towards the edge on the outside of the wall.

5. The battery holder according to claim 4, wherein the socket is dimensioned to engage the circumferential wall of said first cap at one or the other end of the socket.

6. The battery holder according to claim 5, wherein the inside wall of each of the spaces formed by the socket flares toward the adjacent end of the socket.

7. The battery holder according to claim 1, wherein said abutment is formed by a circumferential rib inside said socket.

8. The battery holder according to claim 7, wherein the axial width of said rib is greater than twice the protruding axial length of the central pole contact of a battery to be held by the socket.

9. The battery holder according to claim 1, wherein said socket forms an aperture in the circumferential wall thereof substantially midway of the pocket.

10. The battery holder according to claim 1, wherein at least a central portion of the end wall of said first cap is made of an electrically insulating material.

11. The battery holder according to claim 10, wherein a contact for the central pole contact of a battery in said first cap comprises a stem guided for limited axial displacement in said central portion and wherein the contact can be depressed against spring bias towards said central portion.

12. The battery holder according to claim 1, wherein said second cap is adapted to receive the socket at either end thereof.

13. The battery holder according to claim 12, wherein said second cap forms an inside abutment for said socket, spaced from an end wall of said second cap.

14. The battery holder according to claim 13, wherein said second cap forms an inside circumferential groove of V-shaped cross sectional shape for receiving the O-ring located in the outside groove of the socket adjacent the end thereof which is received by said second cap.

15. The battery holder according to claim 13, wherein an electrically insulating layer is provided on the inside surface of the end wall of said second cap.

16. The battery holder according to claim 15, wherein said layer is formed by a separate disk shaped element.

17. The battery holder according to claim 16, wherein said second cap forms a groove of rectangular cross sectional shapes to receive therein an edge portion of said element.

18. The battery holder according to claim 1 mounted on a battery powered device comprising a body, wherein said body forms a screw threaded bore, said first cap being fixedly mounted at one end thereof, and wherein said second cap is a screw cap screwed into the bore at the other end thereof to form together with the body said clamping means, said socket being received in said bore between said first and second caps.

19. The battery holder according to claim 18, wherein said battery powered device is at least one of a sight, a leveling instrument, and another battery powered device.

20. The battery holder according to claim 1, wherein the first and second caps form mating screw threads for interconnection of the caps with the socket there between, said screw threads forming said clamping means.

* * * * *